United States Patent [19]

Rettkowski

[11] 4,194,573

[45] Mar. 25, 1980

[54] AGRICULTURAL SUBSOIL IMPLEMENT INCLUDING FLOW DIVIDER FOR WHEEL ASSEMBLIES

[75] Inventor: Gale F. Rettkowski, Wilbur, Wash.

[73] Assignee: R & R Agri-Products, Inc., Wilbur, Wash.

[21] Appl. No.: 908,137

[22] Filed: May 22, 1978

[51] Int. Cl.² .................... A01B 63/22; A01B 13/08
[52] U.S. Cl. ............................. 172/400; 172/413; 172/662; 172/699
[58] Field of Search ............... 172/4, 5, 253, 254, 172/328, 345, 400, 413, 656, 663, 699, 700, 741, 2, 456, 662; 280/43.13, 43.23

[56] References Cited

U.S. PATENT DOCUMENTS

| D. 244,753 | 6/1977 | Watts ..................... 172/699 X |
|---|---|---|
| 3,450,212 | 6/1969 | Sylvester ................. 172/699 |
| 3,630,290 | 12/1971 | Williams et al. ........... 172/400 X |
| 3,666,284 | 5/1972 | Hunter et al. ............. 172/413 X |
| 3,961,670 | 6/1976 | Rivinius .................. 172/4.5 |
| 4,106,568 | 8/1978 | Cline ..................... 172/699 X |
| 4,121,852 | 10/1978 | Quanbeck ................. 172/311 X |

OTHER PUBLICATIONS

"The Mighty Amco Yazoo," Amco, Yazoo City, Mississippi, Sep., 1972.
"International II Subsoil Chisel", *International Operator's Manual*, International Harvester Co., Chicago, Ill., Jan., 1976, p. 12.

*Primary Examiner*—Richard T. Stouffer
*Attorney, Agent, or Firm*—Wells, St. John & Roberts

[57] ABSTRACT

An agricultural subsoil implement is described having a V-shaped tool bar with a plurality of subsoiler tools affixed thereto at desired intervals for projecting forward and downward through the topsoil into the subsoil. Each tool has a leading edge that extends along a parabolic curve to provide a positive downward draft without substantially increasing the pull required to draw the tools through the soil. The implement has two independent wheel assemblies mounted on the tool bar intermediate the apex and the outer ends. Each wheel assembly has a standard that exists upward to receive a hydraulic jack. The hydraulic jacks are operatively connected by a flow divider to uniformly apply equal amounts of fluid to each jack. A wheel strut extends forward and downward from the tool bar to axles that carry dual pneumatic tires. The wheel assemblies are aligned with corresponding subsoiler tools with the struts directly over the tool shank so that the shank tip may be raised between the tires.

5 Claims, 7 Drawing Figures

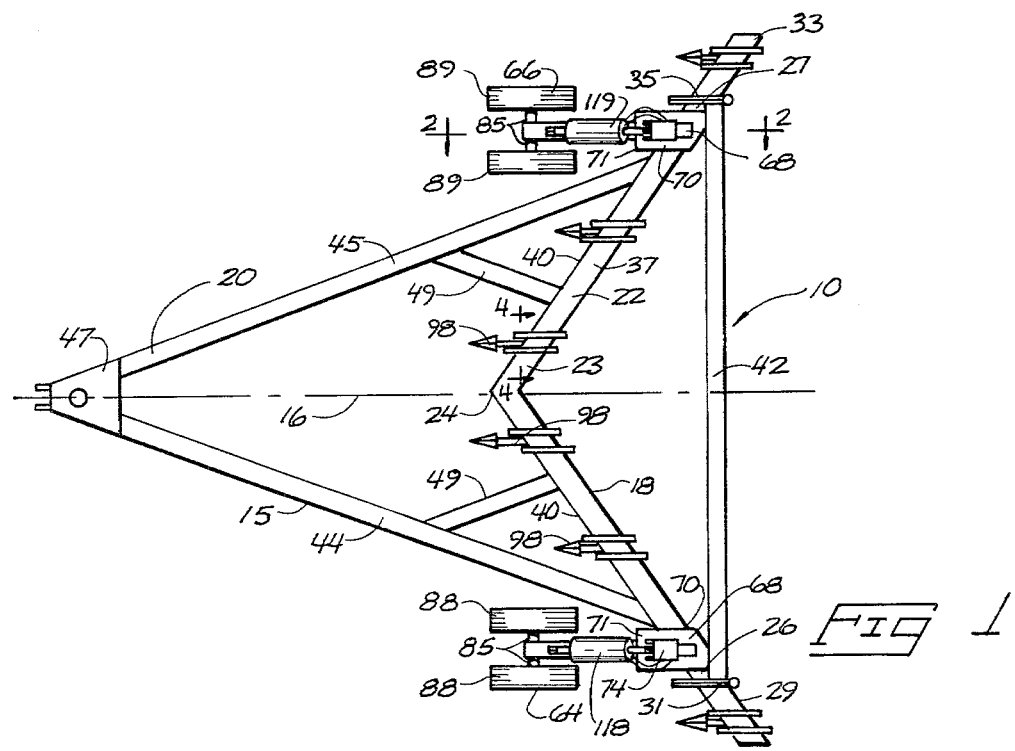
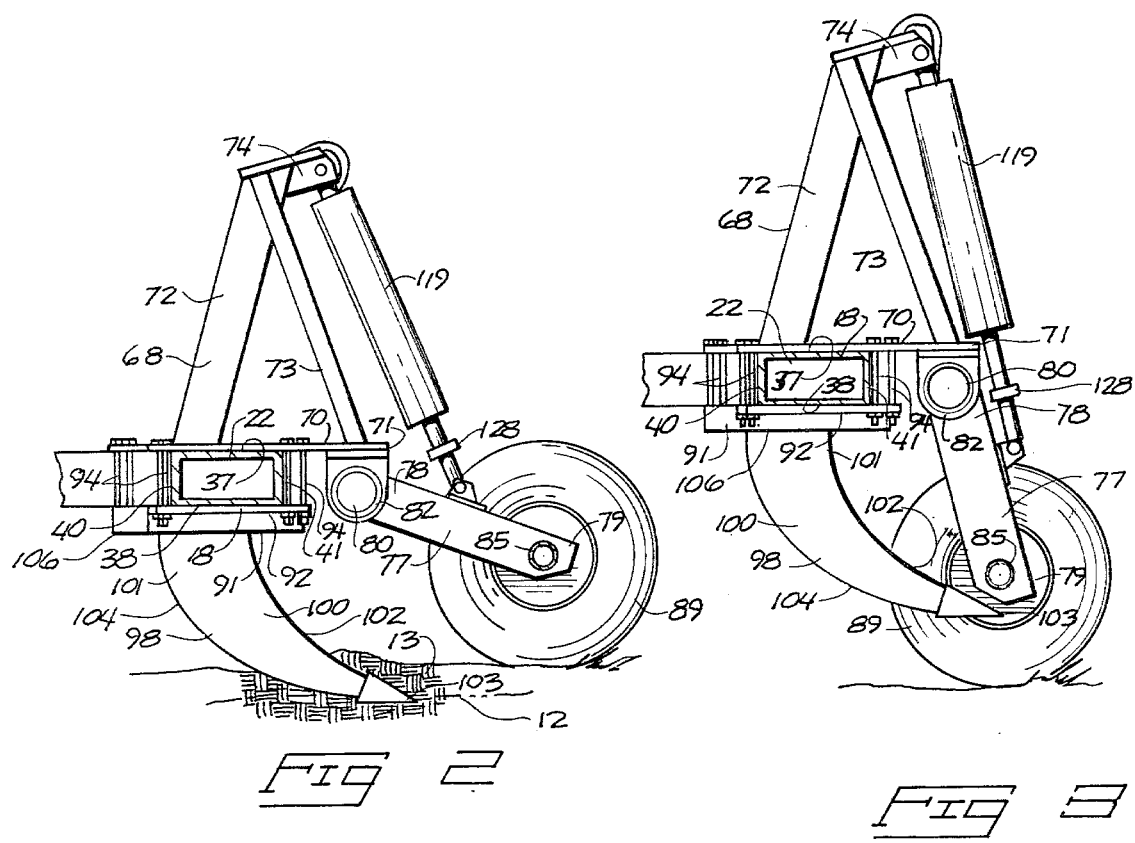

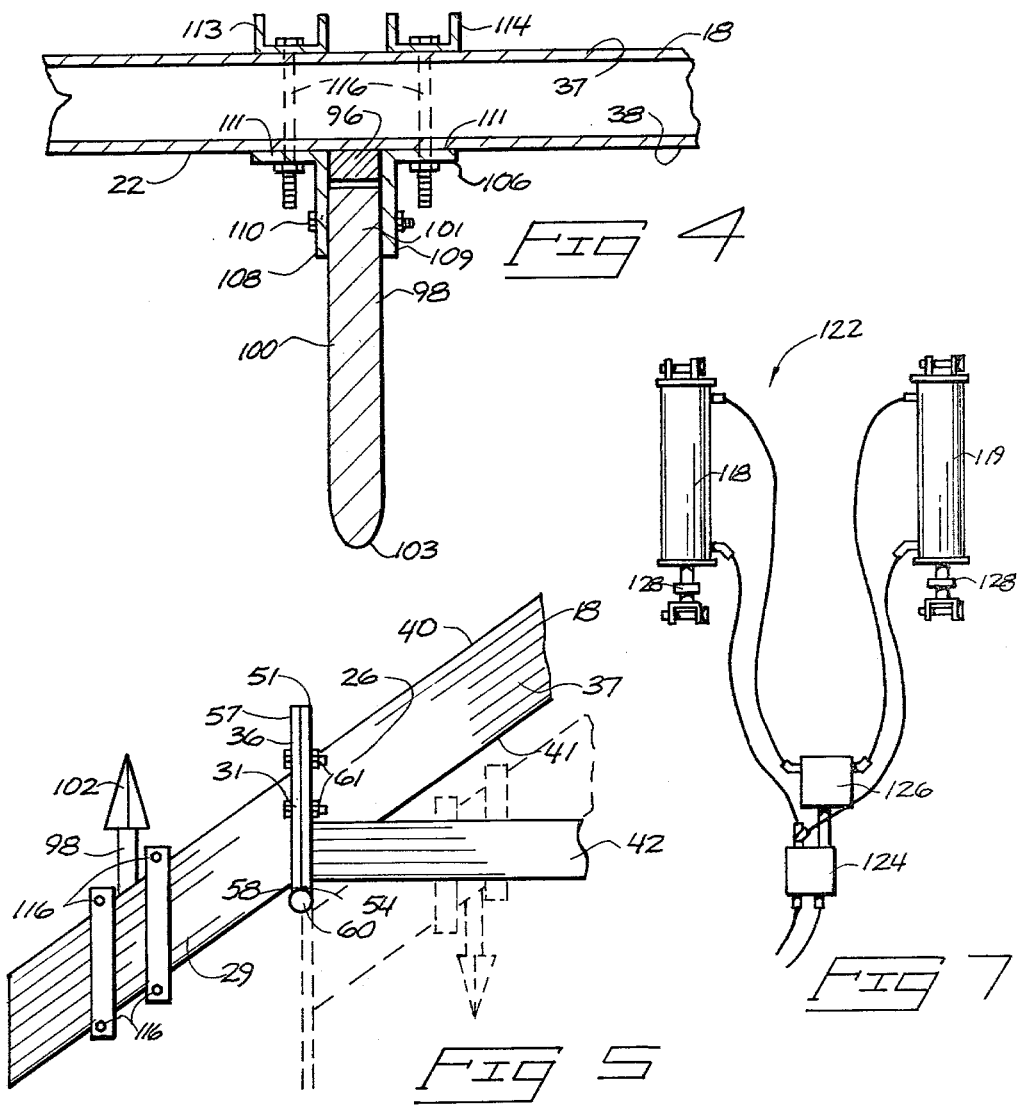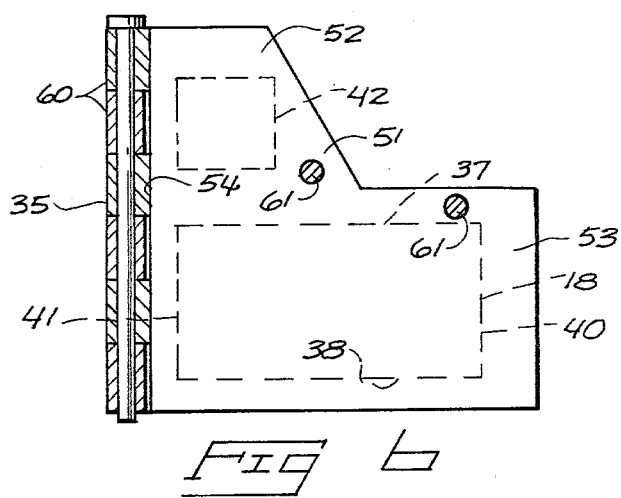

AGRICULTURAL SUBSOIL IMPLEMENT INCLUDING FLOW DIVIDER FOR WHEEL ASSEMBLIES

BACKGROUND OF THE INVENTION

This invention relates to agricultural subsoil implements that are generally classified in the United States Patent Office in Class 172, subclass 699. U.S. Pat. Nos. 2,053,504 (granted to VanSickle on Sept. 8, 1936) and 2,672,084 (granted to Forgy on Mar. 16, 1954) are representative of prior art subsoilers.

The purpose of an agricultural subsoiler is to break up the subsoil without materially disturbing the topsoil to aid in the absorption of moisture and yet prevent erosion.

Most agricultural subsoilers have a positive draft design in which the tools automatically bias the implement downward so that the tools will reach the subsoil or hard pan without external downward forces being required. However, such downward draft substantially increases the tongue force that is required to pull the implement through the ground. Furthermore, most prior art subsoilers are rather nonaccomodating to various types of soils. Most subsoilers are designed for one particular type of soil or soil condition and are not particularly useful in other types of soil, particularly in hilly areas.

It therefore becomes desirable to obtain a versatile agricultural soil implement that is capable of performing in various types of soil conditions under a wide variety of conditions.

It is also desirable to obtain an agricultural subsoil implement that is extremely sturdy, yet quite versatile and efficient.

BRIEF DESCRIPTION OF THE DRAWINGS

A preferred embodiment of this invention is illustrated in the accompanying drawings, in which:

FIG. 1 is a plan view of an agricultural subsoil implement which is the subject of the present invention;

FIG. 2 is a vertical cross-sectional view taken along line 2—2 in FIG. 1 illustrating a wheel assembly in relation to a subsoil tool in which the tool is in a ground engaging position;

FIG. 3 is a vertical cross-sectional view similar to FIG. 2 except the subsoil tool is positioned out of the ground with the implement in the transport position;

FIG. 4 is a vertical cross-sectional view along 4—4 in FIG. 1 showing a tool shank and its respective mounting mechanism;

FIG. 5 is a horizontal fragmentary view of a hinge mechanism of a tool bar of the implement in which the hinge is shown in a working condition in solid line and in a transport condition in dotted line;

FIG. 6 is a detailed vertical cross-sectional view of the hinge mechanism illustrated in FIG. 5; and FIG. 7 is a schematic diagram of the hydraulic system for the implement.

DETAILED DESCRIPTION OF A PREFERRED EMBODIMENT

Referring now in detail to the drawings, there is illustrated in FIG. 1 an agricultural subsoil implement generally designated with the numeral 10 for breaking up the subsoil or hard pan 12 that is beneath topsoil or soft soil 13 as illustrated in FIG. 2. The purpose of the subsoiler is to break up the hard pan so that the soil is more capable of absorbing moisture without substantially disturbing the topsoil to minimize erosion.

The implement 10 generally includes a draft frame 15 that is substantially symmetrical about a center line 16. The draft frame 15 includes an A-shaped tool bar frame 18 that has an apex 24 positioned along the center line 16 extending forward. The draft frame 15 includes a V-shaped hitch frame 20 that is rigidly affixed to the A-shaped tool bar frame and projects forward therefrom.

A-shaped tool bar frame 18 includes a V-shaped tool bar 22 that has a V-shaped central section 23 including the apex 24. The central section 23 extends laterally outward and rearward to left and right ends 26 and 27 respectively. The A-shaped tool bar frame 18 further includes wing sections 29 and 33 that are respectively pivotally connected to the ends 26 and 27 through hinges 31 and 35.

The V-shaped tool bar 22 is preferably formed of a box beam having a rectangular cross section with the longer dimensions extending horizontally and the shorter dimensions being vertical. The tool bar 22 has a top horizontal surface 37 and a bottom parallel horizontal surface 38. Front and rear surfaces 40 and 41 extend from the top horizontal surface 37 downwardly to the bottom horizontal surface 38. The A-shaped tool bar frame 18 further includes a rear crossframe brace 42 that extends between the ends 26 and 27 for providing a sturdy, rigid tool bar frame 18.

The V-shaped hitch frame 20 includes leg members 44 and 45 that extend from a hitch section 47 rearward and outward rigidly interconnecting with the V-shaped tool bar 22 intermediate the apex 24 and the ends 26 and 27. Braces 49 are provided between the V-shaped hitch frame 20 and the leg members 44 and 45 to rigidly interconnect the A-shaped tool bar frame 18 with the V-shaped hitch frame 20.

Each of the hinges 31, 35 include an upright hinge bracket 51 (FIGS. 5 and 6) in the form of a plate, that is rigidly fixed to the ends 26, 27. The bracket 51 includes an upper extension 52 for rigidly connecting to the rear cross brace 42 to provide a triangular frame structure. Each of the brackets 51 further include a forward extension 53 that extends forward of the end 26, 27. Each of the hinge brackets 51 includes a rear vertical edge 54. Each hinge 31, 35 further includes a hinge bracket 56 that is rigidly affixed to the wing section 29, 33. The bracket 56 is in the form of a plate that is capable of mating against the hinge bracket 51 as illustrated in FIGS. 5 and 6. The hinge bracket 56 includes a forward extension 57 that is complementary to the forward extension 53. Likewise, the hinge bracket 56 includes a rear edge 58 that is complementary to the rear edge 54. Hinge elements 60 are affixed along the rear edges 54 and 58 to form a "piano hinge" type having a vertical axis about which the wing sections 29, 33 may pivot with respect to the central section 23. The wing sections 29, 33 enable the subsoil implement to cover a rather wide swath of soil during each path. The wing sections, being pivotal about a vertical axis, enable the implement to be readily moved over a highway with a reduced profile. Bolts 61 hold the forward extensions 53 and 57 together to lock the hinges in the closed position.

The implement 10 further includes two wheel assemblies 64 and 66 that are mounted on opposite sides of the V-shaped tool bar 22. Each wheel assembly 64, 66 is independent of the other. Each wheel assembly 64, 66 includes a wheel assembly frame 68 that has a base plate 70 that is adapted to be mounted on and bear against the top horizontal surface 37 of the tool bar 22. The base plate 70 includes a forward projection 71 that is adapted to extend forward from the front surface 40. The wheel assembly frame 68 includes a standard 72 that extends upward and forward from the base plate 70. Braces 73 are provided between the base plate and the upper portion of the standards 72 to form rigid structure. A hydraulic jack bracket 74 is affixed to the upper portion of each standard 72 for supporting a hydraulic jack.

The wheel assemblies 66, 64 each include a wheel strut 77 that is pivotally connected to the wheel assembly frame 68 and extends forward and downward from the tool bar 22. The wheel strut 77 includes an inner end 78 that is pivotally connected to the base plate 70. The wheel strut 77 extends from the inner end 78 to an outer end 79. The inner ends 78 have a transverse shaft 80 affixed thereto that extend outward from both sides of the strut. The shafts 80 are rotatably mounted in bearings 82 that are fixed to the underside of the forward projection 71. The wheel struts 77 rotate about the horizontal axes of the shafts 80 in a vertical direction.

The outer ends 79 of the wheel struts 77 have stub wheel axles 85 affixed thereto that extend outward on opposite sides for receiving wheel pairs 88 and 89 respectively. The wheels 88 and 89 have pneumatic tires for engaging the top surface of the soil and for enabling the implement to be readily transported over the soil or along a highway. It should be particularly noted that each wheel assembly includes two laterally spaced tires that are positioned on opposite sides of the wheel strut 77.

The wheel assemblies 64, 66 are designed to be adjustably positioned at desired locations along the tool bar 22. Each wheel assembly 64, 66 includes clamp elements 91 and 92 that are designed to bear against the bottom horizontal surface 38 for securing the wheel assemblies securely to the tool bar 22. Tie down bolts 94 extend from the base plate 70 downward to the clamp elements 91 and 92 along the front and rear surfaces 40, 41.

The V-shaped tool bar 22 further includes longitudinal mounting abutments or guides 96 (FIG. 4) that are affixed to the bottom horizontal surface 38 at desired uniform intervals along the length of the V-shaped tool bar 22 for receiving subsoiler tools 98. The mounting abutments 96 prevent the subsoil tools 98 from moving laterally along the bar frame 22 or from twisting with respect to the tool bar. In the preferred embodiment the mounting abutments 96 are located at multiple uniform intervals of twenty, thirty and forty-eight inch intervals so that the subsoil tools 98 may be positioned at every twenty, thirty or forty-eight inches along the tool bar 22 or at multiples thereof.

The implement 10 includes a plurality of the subsoiler tools 98 that are adapted to be mounted to the tool bar 22 at laterally spaced locations for projecting into the ground to disturb the subsoil. Each of the subsoiler tools 98 includes a shank 100 that has a broad upper end 101 for fastening to the tool bar 22. The shank 100 extends downward and forward in a tapered configuration with a front edge 102 formed along a parabolic curve. The lower end of the shank 100 terminates in a forward tip 103 or point. Each shank 100 has a rear edge 104 that extends from the upper end to the forward tip. Each subsoiler tool 98 includes a tool mounting bracket assembly 106 that includes shank clamp elements 108 and 109 (FIG. 4) that are mountable on opposite sides of the upper end 101 for fastening the shank 100 to the bottom surface 38 of the tool bar 22. Bolts 110 extend longitudinally through the shank clamp elements 108, 109 and through the upper end 101 of the shank 100. Each of the shank clamp elements 108, 109 includes a flange 111 that extends outward for engaging the bottom horizontal surface 38.

Furthermore, each tool mounting bracket assembly 106 includes bearing plate elements 113, 114 which are preferably formed of a U-shaped channel for bearing against the top horizontal surface 37. Clamp bolts 116 are utilized and extend downward along the front surface 40 and the rear surface 41 between the shank clamp elements 108, 109 and the bearing plate elements 113 and 114 for securing the subsoiler tools 98 rigidly to the tool bar 22 at the desired locations defined by the abutment 96. It should be noted that the shank clamp elements 108, 109 fit on opposite sides of tool mounting abutments 96 to prevent the tools from twisting.

It should be noted that two of the subsoiler tools 98 (FIGS. 2 and 3) are mounted in alignment with the wheel assemblies. For the two subsoiler tools 98 that are aligned with the wheel brackets, the shanks 100 extend forward and downward in vertical alignment with the wheel struts 77 with the forward tip 103 below the outer end 79. When the wheels are in the transport position as illustrated in FIG. 3 the shank tips 103 project between the respective tires immediately below the stub axles 85. In this manner, the subsoiler tools 98 may be mounted as close as 20 inches from each other along the entire length of the tool bar 22 to uniformly disturb the subsoil across the entire swath taken by the implement.

The implement 10 further includes double acting hydraulic jacks 118 and 119 that are mounted on the respective wheel assemblies 64, 66 for connection between the hydraulic jack brackets 74 and a corresponding bracket on the wheel struts 77. The hydraulic jacks 118 and 119 are utilized for independently pivoting the struts 77 about the respective axes to raise and lower the wheels 88 and 89. As illustrated in FIG. 2 the wheel pairs 88 and 89 are permitted to pivot upward with the tool shanks 100 projecting downward into the ground with the tips 103 engaging the subsoil 12. When it is desired to transport the implement, the hydraulic cylinders 118 and 119 are operated to independently, yet uniformly push the wheels downward to lift the shanks 100 from the ground. It should be noted in the transport position two of the shanks 100 are positioned immediately below the stub axles between the tires. Such a configuration enables the earth, in the path of the wheels, to be cultivated.

The implement 10 has a hydraulic system 122 (FIG. 7) that operates the double acting hydraulic jacks 118, 119 to independently yet uniformly raise and lower the tools 98 with respect to the wheels. The hydraulic system 122 includes a double acting pressure valve 124 to direct the hydraulic fluid to either end of the jacks 118, 119. The hydraulic fluid is directed through a flow divider 126 that divides the flow evenly between the jacks 118, 119 so that each jack receives the same volume of hydraulic fluid independently of the pressure being exerted by the jack. The flow divider causes the tools 98 to be uniformly raised and lowered into the ground, independently of the forces required. The pressure valve 124 has two relief settings—one for raising the tools 98 from the ground and a second for lowering the tools 98 into the ground. Generally a considerably larger pressure is required to lift the tools 98 from the ground than is required to initially start the tools 98 into the ground. For one application, the valve 124 is set for relief at 2000 lbs. to raise the tools 98, that is to extend the jacks 118, 119 and 500 lbs. to lower the tools. Stops 128 are mounted on the rods of the jacks 118, 119 to set the depth of the tools 98 in the ground.

Further, it should be noted that the subsoiler tools 98 are positioned in a V-pattern on the tool bar so that when the tools 98 are positioned relatively close to each other each forward tool partially shatters the subsoil for the following adjacent points or tools. Furthermore, the parabolic shank design provides for a positive down draft with an effective working depth of up to 30 inches under all types of soil conditions. The long parabolic curve allows the front edge 102 to break the ground at a relatively shallow angle to provide a "position" down draft, yet minimizes the draft pull required to pull the implement through the ground. Furthermore, it should be noted that the wheels are positioned intermediate the center front subsoiler tool and the rear outer subsoiler tools so that the implement is relatively balanced with respect to the wheels to prevent undue forces, either upward or downward, from being transferred to the pulling tractor.

Additionally each wheel assembly 64, 66 may be moved laterally along the tool bar 22 to the various locations of the abutments 96 to adjust the spacings of the tools 98 and to balance the implement as desired. Such a feature greatly increases the versatility of the implement. In one model, the implement can accommodate as many as thirteen tools 98.

It should be understood that the above described embodiment is simply illustrative of the principles of this invention and numerous other embodiments may be devised without deviating therefrom. Therefore, only the following claims are intended to restrict and define this invention.

What is claimed is:

1. An agricultural draft drawn subsoil implement, comprising:
    a draft frame assembly for attaching to and being drawn by a tractor in which the frame assembly includes a rigid A-shaped tool bar frame aligned along a center line of the implement with (1) a V-shaped tool bar that extends from an apex rearward and outward on opposite sides of the center line, and (2) a cross frame element interconnecting the V-shaped tool bar spaced from the apex;
    a plurality of subsoiler tools adjustably mounted at laterally spaced locations along the V-shaped tool bar for engaging the soil;
    each of said subsoiler tools having a shank with a parabolic shaped leading edge that extends downward and forward from the tool bar for engaging and breaking the subsoil at an angle sufficient to bias the subsoiler tools downward as the implement is pulled by the tractor;
    wherein the subsoiler tools have adjustable tool mounting brackets that permit the subsoiler shanks to be repositioned laterally on the tool bar;
    two independent wheel assemblies mounted to the V-shaped tool bar on opposite sides of the center line of the implement;
    each of the wheel assemblies having (1) a wheel assembly mounting bracket adjustably mounted to the tool bar in alignment with a corresponding subsoiler shank to enable the wheel assembly to be repositioned when the corresponding subsoiler shank is repositioned, in which the mounting bracket has a standard extending upward and forward of the tool bar; (2) a strut arm with one end pivotally connected to the wheel assembly mounting bracket for pivotal movement about a transverse axis and an opposite end extending forward and downward with respect to the tool bar and overlying the corresponding subsoiler shank; (3) axles affixed to the opposite end of the strut arm and extending laterally outward from opposite sides of the strut arm; and (4) pneumatic wheels mounted to the axles on opposite sides of the strut arm;
    two double acting hydraulic actuating means each affixed to a corresponding wheel assembly standard and operatively connected to a corresponding strut arm for pivoting the respective strut arm about its respective pivot axis to independently pivot the pneumatic wheels downward with the wheels straddling the corresponding shank to pull all the shanks completely out of the soil to enable the implement to be transported and to independently pivot the pneumatic wheels upward to drive the shanks into the subsoil for working the subsoil; and
    a hydraulic system operatively connected to the two double acting hydraulic actuating means and having flow divider means for uniformly applying equal amounts of fluid to each actuating means independently of pressure exerted by each actuating means to uniformly pull all of the shanks out of the soil and uniformly drive the shanks into the subsoil.

2. The agricultural subsoil implement as defined in claim 1 wherein the tool bar includes mounting abutments positioned at lateral intervals along the tool bar on opposite sides of the center line for receiving the tool mounting brackets and for preventing lateral or twisting movement of the tools with respect to the tool bar.

3. The agricultural subsoil implement as defined in claim 1 wherein the tool bar includes wing sections at outer ends thereof that pivot with respect to a central section.

4. The agricultural subsoil implement as defined in claim 1 wherein the tool mounting brackets each include (1) shank clamp elements that clamp an upper end of a shank therebetween and wherein the clamp elements have flanges that extend outward from the shank for engaging an underside of the tool bar, (2) bearing plate elements that engage an upper side of the tool bar, and (3) bolt means extending between the shank clamp elements and the bearing plate elements for adjustably securing the subsoil tools securely to the tool bar.

5. The agricultural subsoil implement as defined in claim 1 wherein each wheel assembly mounting bracket is adjustably mounted on the tool bar for lateral adjustment to a plurality of locations along the tool bar.

* * * * *